United States Patent [19]

Selden

[11] 4,221,160
[45] Sep. 9, 1980

[54] FLUID OPERATING MECHANISM FOR A ROTARY CHUCK

[75] Inventor: Boynton Selden, West Hartford, Conn.

[73] Assignee: Cushman Industries, Incorporated, Hartford, Conn.

[21] Appl. No.: 945,956

[22] Filed: Sep. 26, 1978

Related U.S. Application Data

[63] Continuation of Ser. No. 747,816, Dec. 6, 1976, abandoned.

[51] Int. Cl.$^3$ .................... B23B 31/30; F15B 13/042
[52] U.S. Cl. .......................................... 91/471; 91/32; 91/420; 279/4
[58] Field of Search ................ 279/4; 91/420, 471, 91/32

[56] References Cited

U.S. PATENT DOCUMENTS

| | | | |
|---|---|---|---|
| 2,682,749 | 7/1954 | Pinsenschaum | 91/165 |
| 3,091,256 | 5/1963 | Becker | |
| 3,472,547 | 10/1969 | London | 91/420 X |
| 3,730,539 | 3/1971 | Swanson | 279/4 |
| 3,735,670 | 11/1971 | Smithson | 91/32 |
| 3,908,383 | 9/1975 | Selden | 279/4 X |

Primary Examiner—Irwin C. Cohen
Attorney, Agent, or Firm—Walter Spruegel

[57] ABSTRACT

Fluid operating mechanism providing stationary and rotary companion parts of a fluid coupling having in the rotary part a cylinder with a piston defining therein opposite chuck closing and opening cylinder ends, and ports in both coupling parts which, together with two fixed conduits, form fluid passages to the opposite cylinder ends, with each passage having an interposed check valve and an associated plunger, of which the check valve in either passage will open to admit fluid into, but will normally close to block fluid flow from, the associated cylinder end, and the plunger associated with the check valve in either passage will open this valve on being subjected to the pressure of fluid in the other passage. At least the plunger associated with the check valve for the chuck-closing cylinder end is a stepped plunger with opposite larger and smaller faces, of which the larger face is subjected to the pressure of fluid in the chuck-opening cylinder end and the smaller face is subjected to the pressure of fluid in the passage to the chuck-closing cylinder end ahead of the check valve therein, so that this check valve can be opened for blending the fluid in the chuck-closing clyinder end with fluid of a lower control pressure applied to the passage to this cylinder end ahead of the check valve therein on admission to the chuck-opening cylinder end of fluid lower than the control pressure. There is also provided a system of control valves in association with the mechanism for operating the same for high-low operation of an associated chuck requiring the latter to exert a heavy grip on work for an initial part of a machining operation thereon, followed by a lighter grip on the work for the final part of the machining operation.

7 Claims, 5 Drawing Figures

FLUID OPERATING MECHANISM FOR A ROTARY CHUCK

This is a continuation of application Ser. No. 747,816, filed Dec. 6, 1976, now abandoned.

This invention relates to fluid-operated chucks in general, and to fluid operating mechanism for rotary chucks in particular.

Conventional fluid operating mechanisms for rotary chucks provide a cylinder with a piston therein defining opposite chuck closing and opening cylinder ends, and a fluid coupling. The cylinder is adapted for mounting on the chuck-carrying spindle of a lathe or the like so as to be turnable therewith, while the piston is adapted for operative connection with the jaw actuator of the chuck, and the coupling has companion parts of which one part turns with the cylinder, and the other part is held against rotation and is connectible with two fluid conduits, with these coupling parts having suitable ports that form together with the conduits fluid passages to the opposite cylinder ends. There is also provided valve mechanism which is operable to connect either fluid passage with a fluid pressure source and simultaneously vent the other passage for closing and opening an associated chuck.

Among these fluid operating mechanisms are those of fluid lock type which act to lock the operating fluid in either cylinder end whenever the pressure of the supplying fluid drops below a safe work gripping pressure from any cause whatever, including a leak or break anywhere in the fluid passages. This is achieved by two check valves and associated plungers, of which each check valve is interposed in one of the passages and is normally closed to block fluid flow from the respective cylinder end, and the associated plunger is subjected to fluid in the other passage, with this plunger acting to open the check valve when subjected to such fluid on operating valve mechanism to admit fluid to this other passage and simultaneously vent the opposite passage.

The invention is concerned with fluid operating mechanism of fluid lock type for high-low operation of a chuck, i.e., operation of a chuck in two stages at successive high and low fluid pressures in contrast to a conventional chuck operation of a single stage at a single fluid pressure. High-low operation of a chuck is indicated when a particular machining operation on work calls for a heavy work grip by the chuck for an initial part of the machining operation, followed by a lighter work grip for the remaining part of the machining operation as, for example, in reducing a relatively thick wall of hollow work in an initial rough-machining operation for which a relatively heavy work grip is required, followed by a lighter grip on the work when the same becomes so fragile that the hevy work grip, if it were continued during finish-machining of the work, would most likely permanently distort or fracture the work.

Fluid operating mechanism of fluid lock type for high low chuck operation is disclosed in the patent to Smithson U.S. Pat. No. 3,735,670, dated May 29, 1973. This prior mechanism has the usual fluid passages to the chuck closing and opening cylinder ends, with a check valve in each passage and its associated plunger subjected to fluid in the other passage. These passages serve for supplying fluid to the cylinder for operation of the piston therein as in the aforementioned conventional chuck operation in which the admission of operating fluid to either cylinder end for chuck closing and chuck opening is accompanied by venting of the other cylinder end as a condition precedent to proper functioning of the check valves, i.e., the passages serve in this case to apply fluid to the chuck-closing cylinder end for the high stage of a high-low chuck operation, as well as to apply fluid to the chuck-opening cylinder end for opening the chuck, with the other cylinder end being vented during either of these chuck operations. However, these two fluid passages are of no avail for supplying the cylinder with fluid for the change from the high stage to the low stage of the high-low chuck operation. This is due to the fact that the check valves and their associated plungers do not permit fluid flow in either of these two passages which would meet the imperative requirement of a high-low chuck operation that the change from the high stage to the low stage of such an operation be effected by reducing the pressure of the operating fluid in the chuck-closing cylinder end without, however, evacuating this fluid from this cylinder end that would release the work from the chuck. Thus, such reduction of the pressure of the fluid in the chuck-closing cylinder end, i.e., without evacuation of the fluid therefrom, would require in any event opening of the associated check valve. However, it is well known that this check valve will open only if the fluid passage in which it is interposed is vented, wherefore any attempt at opening this check valve for mere pressure reduction of the operating fluid in the chuck-closing cylinder end without any fluid evacuation therefrom is doomed to failure.

For supplying the cylinder with fluid for the change from the high stage to the low stage of a high-low chuck operation, this prior mechanism relies on a bypass around the check valve in the passage to the chuck-closing cylinder end, and a rather intricate system of control valves which are associated with the bypass and function, at the conclusion of the high stage of an operation, to first bleed fluid from the chuck-closing cylinder end until the pressure of the fluid therein drops from a preset high pressure to a given minimum pressure, and then immediately apply to the bypass fluid of a preset low pressure higher than the minimum pressure for the low stage of the operation. The bypass and the control valves associated therewith perform several functions which are imperative for high-low chuck operation and which the fluid passages with the interposed check valves and their associated plungers could not perform. Thus, and as already mentioned, one of these imperative functions is the bleeding of fluid from the chuck-closing cylinder end for the sole purpose of reducing the pressure of the fluid therein. Another one of these imperative functions lies in bleeding fluid from the chuck-closing cylinder end until the pressure of the fluid therein drops from the preset high pressure to the specified minimum pressure, and then applying to this cylinder end fluid at the preset low pressure for the low stage of the high-low chuck operation. This latter function also takes into account that mere reduction of the pressure of the fluid in the chuck-closing cylinder end from the preset high pressure to the preset low pressure would not bring about the desired changeover from the high stage to the low stage of the chuck operation because this preset low pressure, while fully adequate to hold the work at the desired lighter grip for the low stage of the operation, is mostly too high to permit the operating chuck parts to break loose from their tight binding engagement ensuing from the initial heavy grip exerted on the work. Accordingly, the pressure of the operating fluid in the chuck-closing cylinder end has to be reduced from the preset high pressure to a minimum pressure which must be sufficiently low that the chuck will respond to it in relaxing the heavy work grip, and only then is fluid at the preset low pressure applied to the chuck closing cylinder end for the low stage of the chuck operation. Still another and highly important one of these imperative functions lies in maintaining in the chuck-closing cylinder end throughout the changeover from the high stage to the low stage of the operation fluid of a pressure at which the chuck will retain a positive grip on the work.

While the mechanism performs generally satisfactory, it is also highly complex structurally and is even deficient in a few respects. Thus, the provision in this mechanism of the bypass with the system of associated control valves makes for a highly complex construction and correspondingly high cost of the mechanism. Further, the operational safety afforded by the check valves prevails only during the high stage, but is totally lacking during the low stage, of an operation. Also, with the bypass and the system of associated control valves being closely related with the one fluid passage to the cylinder end which is the designated chuck-closing cylinder end, there is no possible way to convert the mechanism, by mere reversal of two fluid connections, to high-low chuck operation with the other cylinder end serving as the chuck-closing cylinder end.

It is an important object of the present invention to provide fluid operating mechanism of fluid lock type which lends itself to high-low chuck operation, and in which the only available fluid flow paths to and from the cylinder ends are via the check valves of the fluid lock and the two passages in which they are interposed. This fluid operating mechanism, by lacking the bypass and the intricate associated control valves of the aforementioned prior mechanism, is for this reason alone vastly superior to this prior mechanism in the matter of structural simplicity and low cost. Further, by passing all operating fluid through either check valve of the fluid lock in the present mechanism, the safety in chuck operation afforded by the check valves prevails throughout each high-low chuck operation and not only during the high stage of such an operation as in the prior mechanism. Also, and in distinct contrast to the prior mechanism, the present mechanism lends itself to ready conversion for operation with either cylinder end as the chuck-closing cylinder end by simply reversing two connections in the fluid lines to the cylinder ends.

It is another object of the present invention to provide fluid operating mechanism of fluid lock type in which the only fluid paths to the cylinder ends are via the check valves and the two passages in which they are interposed, with the key to high-low chuck operation lying in the arrangement of the check valve and plunger elements of the fluid lock such that the plunger elements perform their designated valve-opening function not only on accustomed venting of the respective fluid passages, but also without venting these passages. With the plunger elements thus able to function for opening their associated check valves without venting the passages in which they are interposed, that most unique and hitherto unattainable step in high-low chuck operation of bleeding some minute quantities of fluid from the chuck-closing cylinder end through the associated check valve for merely lowering the pressure of the fluid therein from the prevailing high pressure, is attainable by opening this check valve without venting the passage in which it is interposed and, instead, admitting to this passage fluid at a lower control pressure with which the fluid in the chuck-closing cylinder end will blend for a drop of its pressure to this lower control pressure.

It is a further object of the present invention to provide fluid operating mechanism of fluid lock type in which fluid of the control pressure admitted to the "primary" passage to the chuck-closing cylinder end, while serving for the primary purpose of blending with the fluid in the chuck-closing cylinder end in order to reduce its pressure as aforementioned, also inherently opposes opening of the check valve in the primary passage by its plunger on accustomed admission to this end of operating fluid to the "secondary" passage to the chuck-opening cylinder end, wherefore for proper performance of the mechanism the fluid admitted to these primary and secondary passages must be effective so that, on the one hand, the valve opening action of the plunger by the fluid in the secondary passage will prevail over the opposition to such plunger action by the fluid in the primary passage, and on the other hand, the fluid in the primary passage and chuck-closing cylinder end must prevail over the fluid in the secondary passage and chuck-opening cylinder end to hold the associated chuck closed so as not to relinguish its positive work grip even for an instant. To achieve this end, the plunger associated with the check valve for the chuck-closing cylinder end is featured as a stepped plunger, of which the larger face is subjected to fluid in the secondary passage, and the smaller face is subjected to fluid in the primary passage between the check valve therein and the associated cylinder end, with the areas of the larger and smaller faces of the plunger being of a given ratio. Thus, assuming that the ratio of the plunger faces be 5 to 1, and that the pressure of the fluid in the primary passage be 100 lbs. per inch$^2$, the check valve in the latter will be opened by the plunger on admitting to the secondary passage fluid of a pressure over 20 lbs. per inch$^2$, as will be understood.

Another object of the present invention is to provide fluid operating mechanism of fluid lock type for high-low chuck operation, of which at least the plunger associated with the check valve for the chuck-closing cylinder end is of the featured stepped kind with a given area ratio between its larger and smaller faces, and to operate the mechanism according to a method which involves, for chuck performance at the high stage of a high-low operation, applying fluid of a given high pressure to the chuck-closing cylinder end via its passage and simultaneously opening the other passage for venting the chuck-opening cylinder end, and changing to chuck performance at the low stage of a high-low chuck operation by first applying to the passages to the chuck closing and opening cylinder ends operating fluid of second and third pressures, respectively, of which the second and third pressures are lower than the given high pressure and are of a ratio smaller than the area ratio of the faces of the stepped plunger to thereby cause opening of the check valve for the chuck-closing cylinder end and a pressure drop of the fluid in the latter from the preset high pressure to the second pressure, and then venting the passage to the chuck-opening cylinder end while supplying the passage of the chuck-closing cylinder end with operating fluid of a fourth pressure which is lower than the given high pressure but not lower than the second pressure. In thus operating the mechanism, the chuck performance is changed from the high stage to the low stage of a high-low chuck operation essentially as in the aforementioned prior mechanism, with this important difference, however, that in the present mechanism the only fluid paths to and from the the cylinder ends are via the check valves and the two passages in which they are interposed. Thus, in the present mechanism the pressure of the fluid in the chuck-closing cylinder end is reduced from the given high pressure to the specified second pressure while fluid of the specified third pressure is applied to the chuck-opening cylinder end, wherefore the effective pressure of fluid on the piston in the cylinder is the differential between these second and third pressures, and this pressure differential has the same effect as the explained minimum fluid pressure in the chuck-closing cylinder end of the prior mechanism, namely to relax the chuck's heavy work grip sufficiently so that the chuck will exert a lighter grip on the work on subsequently venting the chuck-opening cylinder end and applying to the chuck-closing cylinder end fluid of a given low pressure for the chuck performance at the low stage of the high-low chuck operation.

Further objects and advantages will appear to those skilled in the art from the following, considered in conjunction with the accompanying drawings.

In the accompanying drawings, in which certain modes of carrying out the present invention are shown for illustrative purposes.

Figure 1:
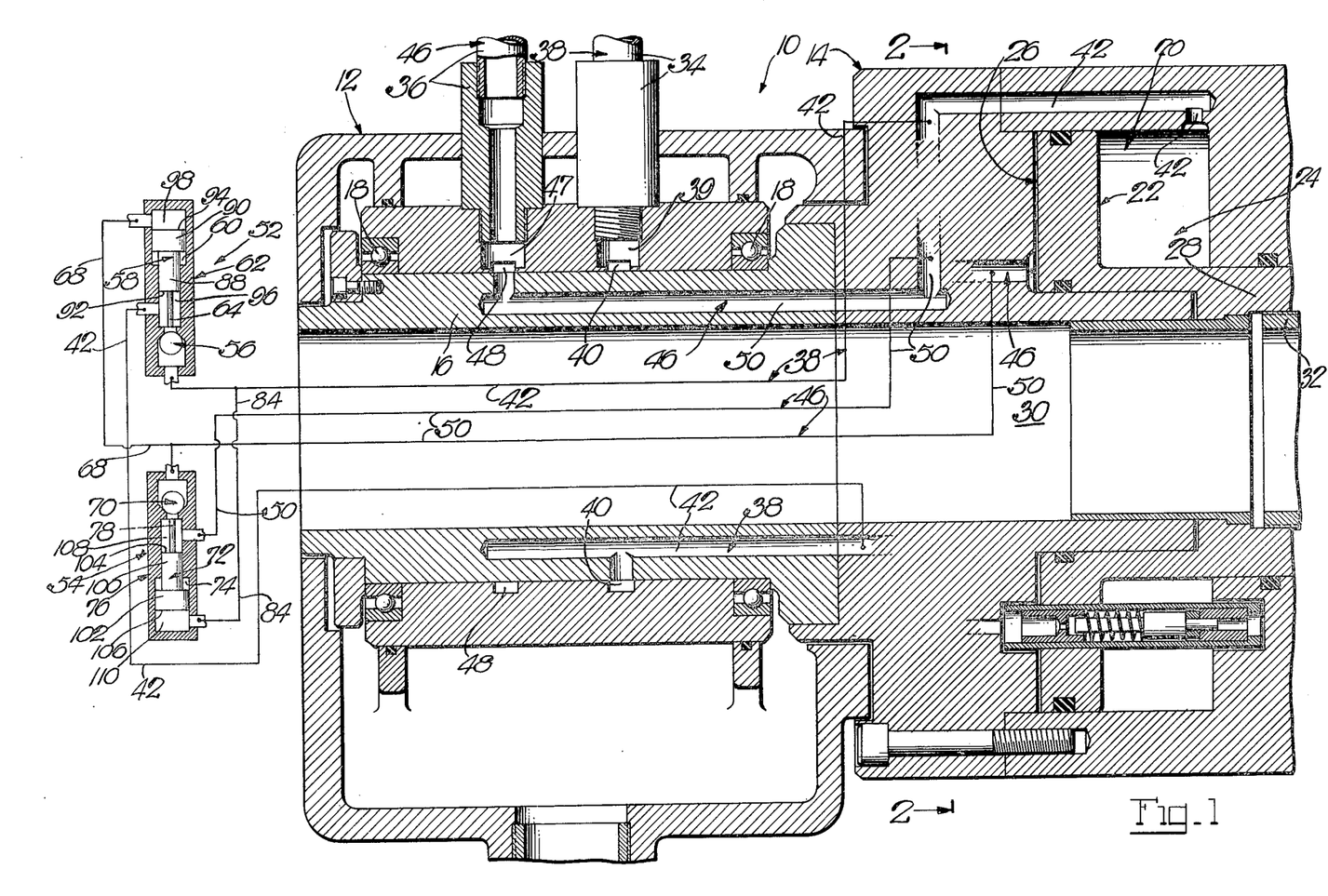
FIG. 1 is a longitudinal section through fluid operating mechanism which embodies the invention.
Figure 2:
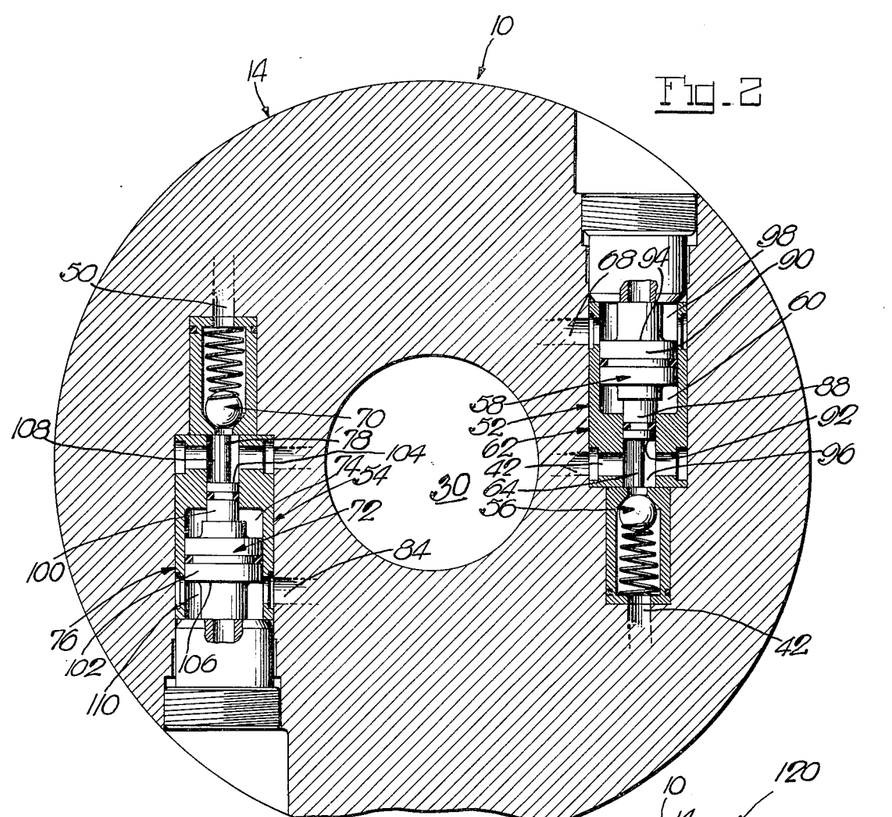
FIG. 2 is a section through the mechanism taken substantially on the line 2—2 of FIG. 1.

Referring to the drawings, and more particularly to FIGS. 1 and 2 thereof, the reference numeral 10 designates a fluid coupling of a chuck operating mechanism. The coupling 10 provides stationary and rotary companion parts 12 and 14, with the rotary part having a cylindrical journal 16 for its rotary support in antifriction bearings 18 in the stationary part 12. The rotary coupling part 14 provides a cylinder 20 with a piston 22 which defines in the cylinder chuck-closing and chuck-opening ends 24 and 26, respectively. The piston 22 is provided with a rod extension 28 which is formed as a sleeve owing to the provision of the exemplary center aperture 30 in the coupling, with this sleeve extension 28 being through a draw bar 32 connected in usual manner with a jaw actuator of an associated chuck (not shown). The chuck is customarily mounted on the front end of a power spindle in a lathe or the like (neither shown), and the coupling 10 is with its rotary part 14 mounted on the rear end of the power spindle in usual manner.

Operating fluid is applied to the cylinder 20 from a suitable fluid pressure source via fixed conduits 34, 36 that lead to the stationary coupling part 12, and suitable orifices in the coupling parts that lead to the opposite ends of the cylinder. Thus, operating fluid is admitted, under suitable valve control, to the chuck-closing cylinder end 24 via a fluid passage 38 which is formed by the fixed conduit 34 that leads to a port 39 with an annular groove 40 in the stationary coupling part 12, and a continuing orifice 42 in the coupling parts 12 and 14 that extends all the way to the chuck-closing cylinder end. Operating fluid is also admitted to the chuck-opening cylinder end 26 via a fluid passage 46 which is formed by the other fixed conduit 36 that leads to a port 47 with an annular groove 48 in the stationary coupling part 12, and a continuing orifice 50 in the coupling parts 12 and 14 that extends all the way to the chuck-opening cylinder end 26. The orifices 42 and 50 are in this instance wholly contained in the coupling parts 12 and 14, but they are represented in part by lines which in FIG. 1 extend outside the coupling parts for a clear demonstration not only of their continuity to the respective cylinder ends, but also of their coordination with fluid lock units 52 and 54 which are shown diagrammatically in FIG. 1, with each of these units having operating valve and associated plunger elements. Thus, the unit 52 provides a check valve 56 and an associated plunger 58, with the plunger being slidable in a cylindrical passage 60 in a casing 62, and having an axial shank 64 for opening the valve 56 on subjection of the plunger 58 to certain fluid pressure described hereinafter. The orifice 42 to the chuck-closing cylinder end 24 is interrupted for interposition thereat of the check valve 56 and of the end of the passage 60 in the casing 62 next to the check valve 56. The opposite end of the passage 60 is through a branch orifice 68 connected with the orifice 50 behind a check valve 70 therein which is part of the other fluid lock unit 54. This other fluid lock unit 54 provides the check valve 70 and an associated plunger 72 in a cylindrical passage 74 in a casing 76, with the plunger 72 having an axial shank 78 for opening the valve 70 on subjection of the plunger 72 to certain fluid pressure described hereinafter. The orifice 50 to the chuck-opening cylinder end 26 is interrupted for interposition of the check valve 70 and and of the end of the passage 74 in the casing 76 next to the check valve 70. The opposite end of the passage 74 is through a branch orifice 84 connected with the orifice 42 behind the check valve 56 therein. The check valves 56 and 70 are arranged to open for fluid admission to, but to close for blocking fluid flow from, their associated chuck-closing and chuck-opening cylinder ends 24 and 26, and the plungers 58 and 72 function, on being subjected to fluid pressure as described hereinafter, to open their associated check valves 56 and 70.

In accordance with an important aspect of the present invention, the plunger 58 of the fluid lock unit 52 is a stepped plunger which is double-acting in performing its designated function of opening the associated check valve 56. Thus, the plunger 58 is formed in stepped cylindrical parts 88 and 90 with diametrically smaller and larger ends or faces 92 and 94, respectively, and the passage 60 in the casing 62 is also formed in stepped sections 96 and 98 for sliding reception of the respective plunger parts 88 and 90, with the diametrically smaller passage section 96 and plunger part 88 being next to the associated check valve 56 (FIG. 1). The plunger 72 of the other fluid lock unit 54 is in this instance also a stepped plunger, being formed in similar stepped cylindrical parts 100 and 102 with diametrically smaller and larger ends or faces 104 and 106, respectively, and the passage 74 in the casing 76 is also formed in stepped sections 108 and 110 for sliding reception of the respective plunger parts 100 and 102, with the diametrically smaller passage section 108 and plunger part 100 being next to the associated check valve 70.

The merit of a stepped plunger lies in its function to open the associated check valve in a fluid passage to a particular cylinder end on admitting operating fluid into the passage to the cylinder end with or without venting of the other passage. Thus, assuming that, for closure of an associated chuck, the chuck-closing cylinder end 24 is supplied with fluid of a given high pressure via the described passage 38, the chuck will be opened on operating valve mechanism to admit fluid under pressure to the chuck-opening cylinder end 26 via the described passage 46 and simultaneously vent the chuck-closing cylinder end 24 via the passage 38. Under these circumstances, the check valve 56 will be opened by the plunger 58, because the face 92 of this plunger is no longer subjected to any fluid pressure the moment the passage 38 is vented, so that the pressure of the fluid admitted to the chuck-opening cylinder end, which is then the only fluid pressure acting on the plunger 58 and more particularly on the face 94 thereof, will open the check valve 56 at any pressure of the fluid then admitted to the chuck-opening cylinder end, as will be readily understood. Assuming now that the chuck-closing cylinder end 24 is supplied via the passage 38 with fluid of a given high pressure at which the associated chuck is closed and holds work with a firm grip, the check valve 56 associated with the chuck-closing cylinder end 24 can be opened without venting the fluid passage 38, by admiting fluid of a first control pressure to the passage 46 and chuck-opening cylinder end 26 and appling to the passage 38 fluid of a second control pressure, the only requirements being that these control pressures are lower than the given high pressure and may be as low as desired, and the total pressure of fluid on the larger face 94 of the plunger 58 is in excess of the total pressure of fluid on the smaller face 92 thereof, with this latter requirement being met as long as the second and first control pressures are of a ratio smaller than the ratio at which the area of the larger face 94 of the plunger 58 is larger than the area of the smaller face 92 thereof. In this connection, it is to be understood that fluid of the given high pressure is in this instance applied to the passage 38 until the fluid of the second control pressure is applied to this passage and ordinarily cause closure of the check valve and, hence, entrapment of the fluid of high pressure in the chuck-closing cylinder end. However, since in this example fluid of the first control pressure has first been applied to the passage 46 and the force it exerts on the larger plunger face 94 overpowers the counterforce of the fluid acting on the smaller plunger face 92, the plunger prevents actual closure of the check valve 56 in this case and, instead, keeps the same open. On the other hand, if the fluid of the second control pressure were applied to the passage 38 before the fluid of the first control pressure is applied to the passage 46, the check valve 56 will actually close on the application of the second control pressure and will be opened with the application of the first control pressure, as will be readily understood. For a better understanding of the action of the stepped plunger 58, let it be assumed that the ratio between the larger and smaller areas of the opposite faces 94 and 92 be 5 to 1, for example, and that the first control pressure of the fluid acting on the larger plunger face 94 be 20 lbs. per inch$^2$, the check valve 56 will be opened without venting the passage 38 to the chuck-closing cylinder end if the second control pressure of the fluid acting on the smaller plunger face 92 is less than 100 lbs. per inch$^2$. In thus admitting fluid of the described first control pressure to the passage 46 and chuck-opening cylinder end 26, and also admitting fluid of the described second control pressure to the other passage 38 in lieu of venting the latter, the plunger 58 will open the associated check valve 56 and thereby release the fluid of high pressure in the chuck-closing cylinder end 24 for assimilation with the fluid of the second control pressure admitted to the passage 38 and establishment of a common pressure, i.e., the second control pressure, for all fluid in the passage 38 and chuck-closing cylinder end 24, as will be readily understood.

The fluid lock units 52 and 54, while shown diagrammatically and outside the fluid coupling 10 in FIG. 1, are in this instance arranged within the fluid coupling 10, and are particularly within the rotary coupling part 14 as shown in FIG. 2 in which parts of the units 52 and 54 are denoted by the same reference numerals as their counterparts in FIG. 1.

Figure 3:
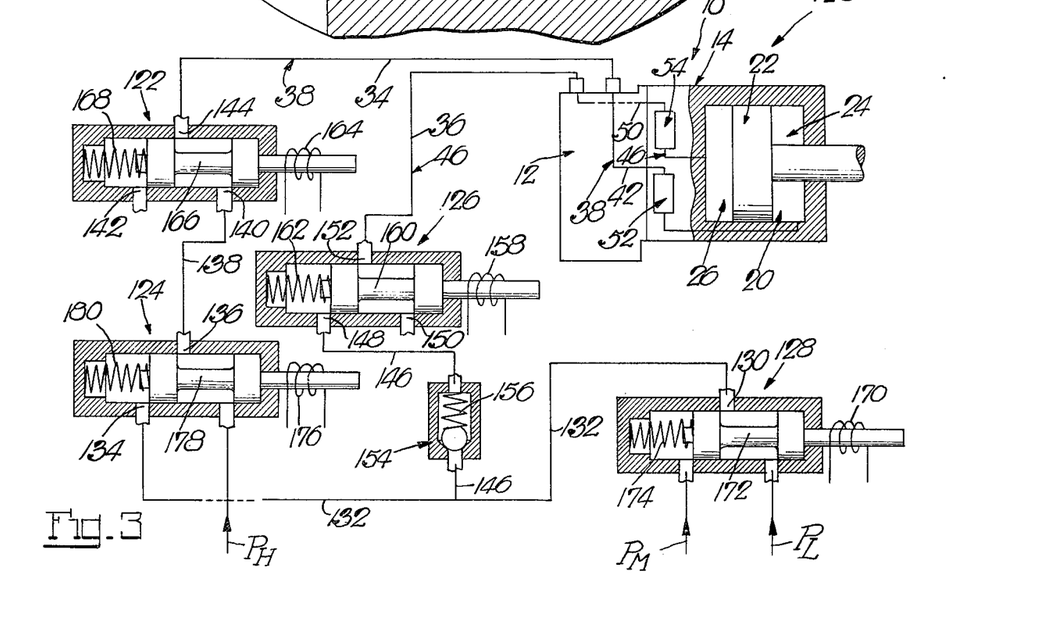
FIG. 3 is a diagrammatic view of fluid operating mechanism, including a system of control valves associated with the mechanism, for high-low chuck operation according to the invention.

Reference is now had to FIG. 3 which shows diagrammatically chuck operating mechanism 120 which includes the fluid coupling 10 in FIGS. 1 and 2, and which lends itself to high-low chuck operation. Thus, the fluid coupling of the diagrammatic showing in FIG. 3 indicates the stationary and rotary companion parts 12 and 14 with the cylinder 20 in the rotary coupling part 14, and the piston 22 which divides the cylinder 20 into the opposite chuck-closing and chuck-opening cylinder ends 24 and 26. Further shown in FIG. 3 are the fluid passages 38 and 46 with their respective conduits 34 and 36 to the fluid coupling 10 and their respective orifices 42 and 50 in the coupling, with the fluid lock units 52 and 54 being also shown in association with the respective fluid passages 38 and 46. The chuck operating mechanism also includes valve mechanism in the form of several valves 122, 124, 126 and 128 which may be operated for high-low chuck operation. Available in this example for operation of the mechanism are three fluid sources of different operating pressures denoted PH, PL and PM of which "H", "L" and "M" signify "high" pressure, "low" pressure and "minimum" pressure, respectively, with the fluid source PH being connected to the valve 124 and the fluid sources PL and PM being connected to the valve 128. Valve 128 has an outlet 130 which through a conduit 132 is connected with an inlet 134 in the valve 124. Valve 124 also has an outlet 136 which through a conduit 138 is connected with an inlet 140 in the valve 122. Valve 122 also has a vent opening 142 and an outlet 144 which is connected with the conduit 34 of the fluid passage 38 to the chuck-closing cylinder end 24. Branching from the conduit 132 is a conduit 146 which is connected with an inlet 148 in valve 126 which also has a vent opening 150 and an outlet 152 which is connected with the conduit 36 of the fluid passage 46 to the chuck-opening cylinder end 26. Interposed in the branch conduit 146 is a check valve 154 which opens to admit fluid above a given pressure to the valve 126, and is normally closed to block fluid flow from the valve 126 to the conduit 132. This valve 126 is normally closed by a spring 156 which is calibrated to permit opening of the valve by fluid in the conduit 132 above the aforementioned given pressure.

Following is a description of a high-low chuck operation by the mechanism 120. Let it be assumed that the associated chuck is held open by connection of the chuck-opening cylinder end 26 with the fluid pressure source PL and simultaneous venting of the chuck-closing cylinder end 24, with the connection of the chuck-opening cylinder end 26 with the fluid pressure source PL being via the fluid passage 46, valve 126, conduit 146 with the interposed check valve 154, and conduit 132, with the sliding member 160 of the valve 126 being to this end shifted to its other position against the force of the return spring 162 on energizing a relay 158, and venting of the chuck-closing cylinder end 24 being via the fluid passage 38 and the vent opening 142 in valve 122 on energizing a relay 164 and thereby shifting the member 166 of valve 122 to its other position against the force of the return spring 168. A high-low chuck operation by the mechanism, and more particularly the high stage thereof, will be started by connecting the chuck-closing cylinder end 24 with the fluid pressure source PH on deenergizing the relay 164 for spring return of the member 166 of valve 122 to the position shown, and venting the chuck-opening cylinder end 26 via the fluid passage 46 and through the vent opening 150 in valve 126 on deenergizing the relay 158 for spring return of the valve member 160 to the position shown. The chuck will be power-driven during the high stage of its operation. When the high stage of the chuck operation is concluded, the power drive of the chuck is preferably stopped and the mechanism is operated for changing from the high stage to the low stage of the chuck operation, with the power drive of the chuck being resumed when the chuck resumes its operation at the low stage. For changing from the high stage to the low stage of the chuck operation, the chuck-opening cylinder end 26 and the fluid passage 38 are successively connected with the fluid pressure sources PL and PM, respectively, with the chuck-opening cylinder end 26 being connected with the fluid pressure source PL via conduit 132, the branch conduit 146 with the interposed check valve 154, valve 126 and fluid passage 46, on energizing the relay 158 and thereby shifting the member 160 of valve 126 to its other position against the force of the return spring 162, and the fluid passage 38 being connected with the fluid pressure source PM via conduit 132, valve 124, conduit 138 and valve 122 on energizing a relay 170 and thereby shifting the member 172 of the valve 128 to its other position against the force of the return spring 174, and further energizing a relay 176 and thereby shifting the member 178 of the valve 124 to its other position against the force of the return spring 180. In thus connecting the chuck-opening cylinder end 26 and the fluid passage 38 with the respective fluid pressure sources PL and PM, the pressure of the fluid acting on the larger face 94 of the plunger 58 (FIG. 1) is that of PL minus the pressure of fluid required to open the spring-closed check valve 154 (FIG. 3), while the pressure of the fluid acting on the smaller face 92 of the plunger 58 is that of the fluid source PM. Further, the closing spring 156 of the check valve 154 is calibrated so that the pressure of fluid in the conduit 132 required to overpower this spring 156 and open the valve 154 must be in excess of PM, wherefore on connecting the fluid passage 38 with the fluid pressure source PM as described, fluid from this source then admitted to the conduit 132 will not open the check valve 154. Still further, the pressure of the fluid source PL, while lower than the pressure of the fluid source PH, must be such that on connecting the chuck-opening cylinder end 26 with the fluid pressure source PL via the check valve 154 and valve 126 as described, the pressure of the fluid then admitted to the chuck-opening cylinder end, being the pressure of the fluid source PL minus the pressure of fluid required to open the check valve 154, must be lower than the pressure of the fluid source PM for a reason explained hereinafter. Thus, on connecting the chuck-opening cylinder end 26 and the fluid passage 38 with the fluid pressure sources PL and PM, respectively, as described, the pressure of the fluid acting on the larger face 94 of the plunger 58 is lower than the pressure of the fluid from the source PM acting on the smaller face 92 of the plunger 58. This is a prerequisite for achieving, on the one hand, the required opening of the check valve 56 without venting of the fluid passage 38, and the ensuing release of the fluid of high pressure in the chuck-closing cylinder end 24 for assimilation with the fluid of the pressure PM admitted to the passage 38 and establishment of a common pressure, i.e., the pressure of the fluid source PM, for all fluid in the passage 38 and chuck-closing cylinder end 24, and for achieving, on the other hand, and after the establishment of the common pressure of all fluid in the passage 38 and chuck-closing cylinder end 24, imperative retention of a positive work grip by the chuck at any instant. The check valve 56 will be opened under the conditions just described even though the pressure, i.e., the specific pressure, of the fluid acting on the larger face 94 of the plunger 58 is lower than the pressure, i.e., the specific pressure, of the fluid then acting on the smaller face 92 of this plunger, because the effective total pressure of the fluid on the larger plunger face 94 is indeed greater than the effective total pressure of the fluid on the smaller plunger face 92 as long as the specific pressures of the fluid on the smaller and larger plunger faces 92 and 94 are of a ratio smaller than the ratio of the areas of the larger and smaller plunger faces. For a better understanding of this, let it be assumed that the area of the plunger face 94 be an exemplary 5 inch$^2$ and that the area of the other plunger face 92 be 1 inch$^2$ at an exemplary area ratio of 5 to 1 of these plunger faces, that the specific pressures of the fluid sources PL and PM be 90 and 50 lbs. per inch$^2$, respectively, and that the minimum pressure required to open the check valve 154 be 50 lbs. per inch$^2$, the specific pressure of the fluid supplied from the source PL and acting on the larger plunger face 94 would be 90 minus 50 or 40 lbs. per inch$^2$, while the specific pressure of the fluid supplied from the source PM and acting on the smaller plunger face 92 would be 50 lbs. per inch$^2$. Under these circumstances, the total pressure of fluid on the larger plunger face 94 would be 40 times 5 lbs. or 200 lbs., while the total pressure of fluid on the smaller plunger face 92 would be 50 times 1 or 50 lbs., wherefore the total pressure of fluid on the larger plunger face, being greater than the total pressure of fluid on the smaller plunger face, would indeed open the check valve 56. Also, the ratio of the specific fluid pressures acting on the smaller and larger plunger faces 92 and 94, being in this example 50 to 40 or 5 to 4, is indeed smaller than the area ratio of 5 to 1 of the plunger faces 94 and 92, as is required for opening of the check valve 56 without venting the fluid passage 38.

Connection of the chuck-opening cylinder end 26 and of the fluid passage 38 with the respective fluid pressure sources PL and PM will bring about establishment of a common pressure, i.e., that of the fluid source PM, of all fluid in the passage 38 and chuck-closing cylinder end 24, and this common fluid pressure corresponds to the hereinbefore explained minimum fluid pressure at which the chuck will relax its work grip, but which is too low for a safe grip of the work by the chuck for the low stage of its operation. Accordingly, once this common minimum fluid pressure is established for all fluid in the passage 38 and chuck-closing cylinder end 24, the work grip of the chuck is increased to where it is safe for the low stage of the chuck operation. This is achieved in this instance by venting the chuck-opening cylinder end 26 via the fluid passage 46 and vent opening 150 in the valve 126 on deenergizing the relay 158 for spring return of the member 160 of the valve 126 to the position shown, and connecting the fluid pressure source PL with the chuck-closing cylinder end 24 via conduit 132, valve 124, conduit 138, valve 122 and fluid passage 38, on deenergizing relay 170 for spring return of the member 172 of valve 128 to the position shown, and maintaining the relay 176 energized to keep the member 178 of the valve 124 in its other position against the force of the return spring 180. The chuck will now resume its operation at the low stage thereof. Once the low stage of the chuck operation is concluded, the power drive of the chuck is stopped and the chuck is opened for release of the work therefrom, with opening of the chuck being achieved by connecting the chuck-opening cylinder end 26 with the fluid pressure source PL via conduit 132, conduit 146 with the interposed check valve 154, valve 126 and fluid passage 46 on energizing the relay 158 to shift the member 160 of valve 126 to its other position against the force of the return spring 162, and venting the chuck-closing cylinder end 24 via the fluid passage 38 and vent opening 142 in valve 122 on energizing the relay 164 for shifting the member 166 of valve 122 to its other position against the force of the return spring 168.

It will be noted that high-low chuck operation by the mechanism 120 with the cylinder end 24 being the designated chuck-closing cylinder end requires only one stepped plunger, i.e., the plunger 58 associated with the check valve 56 for the designated chuck-closing cylinder end. Of course, by forming the plungers 58 and 72 for both check valves as stepped plungers, high-low chuck operation by the mechanism with the cylinder end 26 being the designated chuck-closing cylinder end is accomplished by mere reversal of two connections in the fluid lines to the cylinder ends, as will be readily understood. The check valve 56 affords the usual safety in operation of the mechanism during the high and low stages of a high-low chuck operation, in that the operation fluid in the chuck-closing cylinder end will be trapped therein if the fluid supply thereto should be interrupted at any time, as by a leak in or rupture of the supply line to this cylinder end. The other valve 70 will afford the same safety in operation of the mechanism if the other cylinder end 26 is used as the chuck-closing cylinder end on reversing two connections in the fluid supply lines to the cylinder ends. Also, while the operating fluid used in the described operation of the mechanism is air which accounts for the described venting of fluid at the openings 142 and 150 in the valves 122 and 126, it is, of course, entirely feasible to use liquid, such as oil, for example, as the operating fluid for the mechanism in which case the openings 142 and 150 in the valves 122 and 126 are connected with return lines to a liquid supply or supplies for pumps that may constitute the fluid pressure sources.

Figure 4:
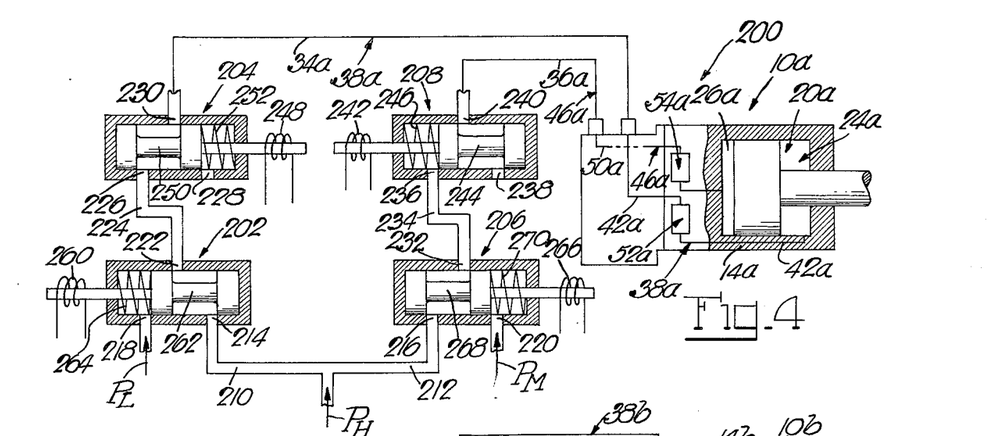
FIG. 4 is a diagrammatic view of fluid operating mechanism, including a modified system of control valves therefor, for high-low chuck operation in accordance with the invention.

Reference is now had to FIG. 4 which shows diagrammatically chuck-operating mechanism 200 which also lends itself to high-low operation of an associated chuck, and includes valve mechanism which differs in several respects from the valve mechanism in FIG. 3. Thus, while the valve mechanism of FIG. 3 requires the establishment of two different fluid pressures in the chuck-closing cylinder end for the two functions of relaxing the work grip of the chuck and subsequently operating the chuck at the low stage of its operation, the valve mechanism of FIG. 4 requires the establishment of only one fluid pressure in the chuck-closing cylinder end for the same two functions. Also, while the valve mechanism of FIG. 3 requires an extra check valve 154, the valve mechanism of FIG. 4 does not require such an extra check valve. Still further, while with the valve mechanism of FIG. 3 the chuck is opened with a force which is way below the force with which the chuck is closed for the high stage of its operation, the valve mechanism of FIG. 4 follows the more usual procedure of opening the chuck with a force equal to that with which the same is closed. The valve mechanism of FIG. 4 provides in this instance four separate valves 202, 204, 206 and 208, and there are available three fluid sources PH, PL and PM of different pressures, of which "H", "L" and "M" signify "high" pressure, "low" pressure and "minimum" pressure, respectively. The fluid source PH is by conduits 210 and 212 connected with inlets 214 and 216 in the valves 202 and 206. The fluid pressure source PL is connected with another inlet 218 in the valve 202, while the remaining fluid pressure source PM is connected with another inlet 220 in the valve 206. The valve 202 also has an outlet 222 which through a conduit 224 is connected with an inlet 226 in the valve 204, with the latter also having a vent opening 228 and an outlet 230 which is connected to a conduit 34a that extends to a fluid coupling 10a which may in all respects be like the coupling 10 of FIGS. 1 and 2. The conduit 34a connects with an orifice 42a that extends in the coupling 10a and leads to the chuck-closing cylinder end 24a of the cylinder 20a in the rotary coupling part 14a, with the conduit 34a and orifice 42a together defining a fluid passage 38a from the valve 204 to the chuck-closing cylinder end 24a. The valve 206 has an outlet 232 which through a conduit 234 is connected with an inlet 236 in the valve 208, and the latter also has a vent opening 238 and an outlet 240 to which is connected a conduit 36a that extends to the fluid coupling 10a. The conduit 36a connects with an orifice 50a which extends in the coupling 10a and leads to the chuck-opening cylinder end 26a, with the conduit 36a and orifice 50a together defining a fluid passage 46a from the valve 208 to the chuck-opening cylinder end 26a. FIG. 4 also shows fluid lock units 52a and 54a in association with the fluid passages 38a and 46a.

Let it now be assumed that the associated chuck is open, with fluid from the source PH being then admitted to the chuck-opening cylinder end 26a via conduit 212, valve 206, conduit 234, valve 208 and fluid passage 46a, on energizing a relay 242 and ensuing shift of the member 244 of valve 208 to its other position against the force of a return spring 246, and the chuck-closing cylinder end 24a being then vented via fluid passage 38a and the vent opening 228 in the valve 204 on energizing a relay 248 and ensuing shift of the member 250 of valve 204 to its other position against the force of the return spring 252. The high stage of a high-low chuck operation may then be started by connecting the chuck-closing cylinder end 24a with the fluid pressure source PH and simultaneously venting the chuck-opening cylinder end 26a, with the cylinder end 24a being connected with the fluid pressure source PH via conduit 210, valve 202, conduit 224, valve 204 and fluid passage 38a on deenergizing relay 248 for spring return of the member 250 of valve 204 to the position shown, and the other cylinder end 26a being vented via fluid passage 46a and the vent opening 238 in valve 208 on deenergizing relay 242 and ensuing spring return of the member 244 of valve 208 to the position shown. At the conclusion of the high stage of the chuck operation, the mechanism 200 is operated for the low stage of the chuck operation. To the latter end, the fluid passage 38a and the chuck-opening cylinder end 26a are connected with the fluid pressure sourced PL and PM, respectively, whereby either connection may be established first. Thus, the fluid passage 38a is connected with the fluid pressure source PL via valve 202, conduit 224 and valve 204 on energizing a relay 260 and ensuing shift of the member 262 of valve 202 to its other position against the force of the return spring 264, while the chuck-opening cylinder end 26a is connected with the fluid pressure source PM via valve 206, conduit 234, valve 208 and fluid passage 46a on energizing a relay 266 with ensuing shift of the member 268 of valve 206 to its other position against the force of the return spring 270 and also energizing the relay 242 for shifting the member 244 of valve 208 to its other position against the force of the return spring 246. With the pressures of the fluid sources PL and PM being lower than that of the fluid source PH, and with the pressures of these fluid sources PL and PM being, furthermore, of a ratio smaller than the ratio of the larger and smaller areas of the opposite faces of the plunger associated with the check valve for the chuck-closing cylinder end 24a, the pressures of fluid then acting on the opposite faces of this plunger compel opening of the associated check valve and assimilation of the fluid of high pressure in the chuck closing cylinder end 24a with the fluid from the source PL admitted to the fluid passage 38a and establishment of a common pressure, i.e., that of the fluid from the source PL, for all fluid in the passage 38a and chuck-closing cylinder end 24a, with ensuing relaxation of the work grip of the chuck. Once this is accomplished, the work grip of the chuck is increased to that required for the low stage of the chuck operation by simply venting the chuck-opening cylinder end 26a via fluid passage 46a and the vent opening 238 in valve 208 on deenergizing relay 242 for spring return of the member 244 to the position shown. The chuck is now set for the low stage of its operation on resuming the chuck drive. At the conclusion of the low stage of the chuck operation, the drive of the chuck is stopped and the chuck is opened as described earlier for release of the work therefrom.

Figure 5:
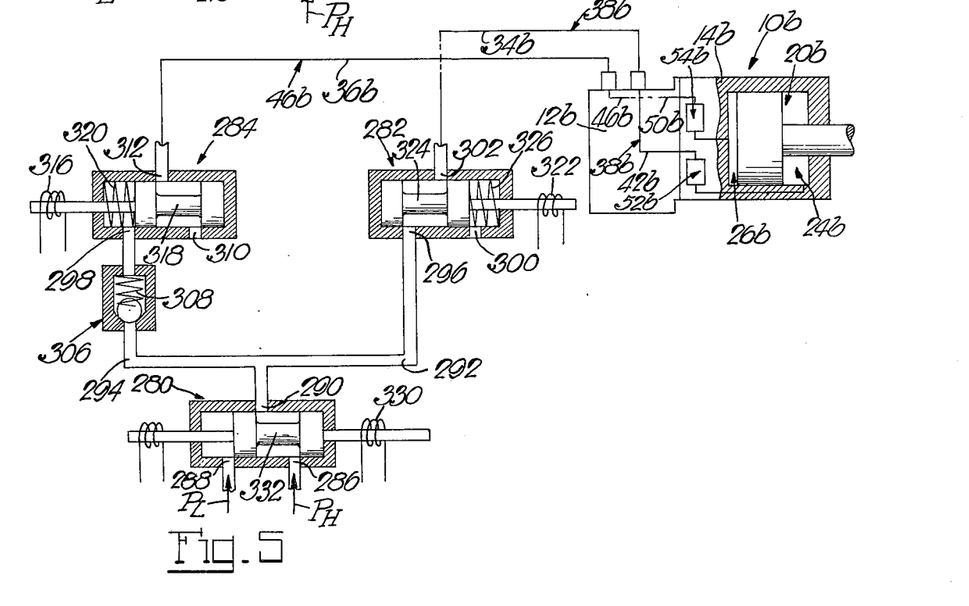
FIG. 5 is a diagrammatic view of fluid operating mechanism, including another modified system of control valves therefor, for high-low chuck operation according to the invention.

Reference is finally had to FIG. 5 which shows diagrammatically chuck operating mechanism which also lends itself to high-low operation of an associated chuck and includes valve mechanism which is modified from those of FIGS. 3 and 4. The valve mechanism of FIG. 5 provides in this instance only three valves 280, 282 and 284, and is otherwise further distinguished from the other valve mechanisms by requiring only two fluid pressure sources PH and PL, of which "H" and "L" signify "high" pressure and "low" pressure, respectively. The fluid pressure sources PH and PL are connected to inlets 286 and 288 in the valve 280 which also has an outlet 290 that is connected through branch conduits 292 and 294 with inlets 296 and 298 in the valves 282 and 284. Valve 282 is provided with a vent opening 300 and also with an outlet 302 which is connected with a conduit 34b which extends to the stationary part 12b of the fluid coupling 10b the rotary companion part 14b of which provides a cylinder 20b with its chuck-closing and chuck-opening cylinder ends 24b and 26b. The conduit 34b connects with an orifice 42b in the coupling 10b which leads to the chuck-closing cylinder end 24b, with the conduit 34b and orifice 42b together defining a fluid passage 38b from the valve 282 to the chuck-closing cylinder end 24b. Interposed in the branch conduit 294 is a check valve 306 which is normally closed by a spring 308 to block fluid flow from the valve 284 to the valve 280. The valve 284 is provided with a vent opening 310 and also with an outlet 312 which is connected with a conduit 36b that extends to the coupling 10b and there connects with an orifice 50b in the coupling which leads to the chuck-opening cylinder end 26b, with the conduit 36b and orifice 50b together defining a fluid passage 46b from the valve 284 to the chuck-opening cylinder end 26b. Also shown diagrammatically are the fluid lock units 52b and 54b in association with the fluid passages 38b and 46b.

Let it now be assumed that the associated chuck is open, with the fluid pressure source PH being then connected with the chuck-opening cylinder end 26b, and the chuck-closing cylinder end 24b being vented, with the fluid pressure source PH being connected with the chuck-opening cylinder end 26b via valve 280, branch conduit 294 with the interposed check valve 306, valve 284 and fluid passage 46b, on energizing a relay 316 and ensuing shift of the member 318 of valve 284 to its other position against the force of a return spring 320, and the chuck-closing cylinder end 24b being vented via fluid passage 38b and vent opening 300 in valve 282 on energizing a relay 322 and ensuing shift of member 324 of valve 282 into its other position against the force of a return spring 326. The high stage of a high-low chuck operation may then be started by connecting the fluid pressure source PH with the chuck-closing cylinder end 24b via valve 280, branch conduit 292, valve 282 and fluid passage 38b, on deenergizing relay 322 and ensuing spring return of the member 324 to the position shown, and venting the chuck-opening cylinder end 26b via fluid passage 46b and vent opening 310 in valve 284 on deenergizing relay 216 and ensuing spring return of the member 318 of valve 284 to the position shown. At the conclusion of the high stage of the chuck operation, the valve mechanism is operated for the low stage of the chuck operation. To this end, the fluid passage 38b and the chuck-closing cylinder end 24b are first connected with the fluid pressure source PL, with the fluid passage 38b being connected with this fluid pressure source via valve 280, branch conduit 292 and valve 282, on energizing a relay 330 and ensuing shift of a member 332 of valve 280 to its other position, and the chuck-opening end 26b being connected with the fluid pressure source PL via valve 280, branch conduit 294 with the interposed check valve 306, valve 284 and fluid passage 46b, on energizing relay 316 and ensuing shift of the member 318 of valve 284 to its other position against the force of the return spring 320. The pressure of fluid thus admitted to the passage 38b of that of the fluid supply PL, while the pressure of fluid admitted to the chuck-opening cylinder end 26b is that of the fluid supply PL minus the pressure of fluid required to open the check valve 306, with the closing spring 308 of the latter bing calibrated so that the pressures of the fluid admitted to the passage 38b and to the chuck-opening cylinder end 26b are of a ratio smaller than the ratio of the larger and smaller faces of the plunger associated with the check valve in the fluid passage 38b in order that this plunger will open the associated check valve and thereby permit assimilation of the fluid of high pressure in the chuck-closing cylinder end 24b with the fluid admitted to the passage 38b and establishment of a common pressure, i.e., that of the fluid admitted to this passage, for all fluid in the latter and in the chuck-closing cylinder end and thereby cause relaxation of the work grip by the chuck. Once this is accomplished, the work grip of the chuck is increased to that prescribed for the low stage of the chuck operation, by simply venting the chuck-opening cylinder end 26b via fluid passage 46b and vent opening 310 in valve 284 on deenergizing the relay 316 for spring return of the member 318 of valve 284 to the position shown. The chuck is now set for the low stage of its operation on resuming the chuck drive. At the conclusion of the low stage of the chuck operation, the drive of the chuck is stopped and the chuck is opened for release of the work.

What is claimed is:

1. In a method of relaxing the work grip of a chuck operated by mechanism having a cylinder in which a piston defines first chuck-closing and second chuck-opening ends, first and second fluid passages leading to said first and second cylinder ends, respectively, a check valve and a plunger, of which the check valve is interposed in said first passage and divides the same into first and second sections of which said second section extends between the check valve and first cylinder end, with the check valve being normally closed to block fluid flow from said first cylinder end and second passage section, and the plunger having opposite first and second faces subjected to fluid in said first passage section and in said second passage, respectively, with said second face being of an area larger than that of said first face at a given ratio, and the plunger opening the check valve when the total pressure of fluid on said second face exceeds the total pressure of fluid on said first face, the method steps which comprise, applying to said first cylinder end fluid of a first pressure via said first and second passage sections and check valve for maintaining the work grip of the chuck, and applying to said first passage section and second passage fluid of second and third pressures, respectively, with said second and third pressures being lower than said first pressure and being of a ratio smaller than said area ratio, so that the check valve will be opened to blend said first and second pressures for work grip relaxation.

2. Method of actuating for high-low chuck operation mechanism having a cylinder in which a piston defines first chuck-closing and second chuck-opening ends, first and second fluid passages leading to said first and second cyliner ends, respectively, a check valve and a plunger, of which the check valve is interposed in said first passage and divides the same into first and second sections of which the second section extends between the check valve and first cylinder end, with the check valve being normally closed to block fluid flow from said first cylinder end and second passage section, and the plunger has opposite first and second faces subjected to fluid in said first passage section and in said second passage, respectively, with said second face being of an area larger than that of said first face at a given ratio, and the plunger opening the check valve when the total pressure of fluid on said second face exceeds the total pressure of fluid on said first face, said method comprising, for the high stage of the chuck operation, applying to said first cylinder end fluid of a first pressure via said first and second passage sections and check valve while simultaneously venting said second passage, then relaxing the work grip of the chuck by applying to said first passage section and to said second passage fluid of second and third pressures, respectively, with said second and third pressures being lower than said first pressure and being of a ratio smaller than said area ratio so that the check valve is opened for blending the first and second pressure fluid in said first passage and first cylinder end for work grip relaxation, and for the low stage of the chuck operation, venting said second passage while applying to said first passage section fluid of a fourth pressure which is lower than said first pressure but not lower than said second pressure.

3. The method of claim 2, in which said fourth pressure is equal to said second pressure.

4. The method of claim 2, in which said fourth pressure is higher than said second pressure.

5. Method of actuating for high-low chuck operation mechanism having a cylinder in which a piston defines first chuck-closing and second chuck-opening ends, first and second check valves, first and third fluid passages leading to said first check valve and extending from the latter to said first cylinder end, respectively, second and fourth fluid passages leading to said second check valve and extending from the latter to said second cylinder end, respectively, with said first and second check valves being normally closed to block fluid flow from the respective first and second cylinder ends, and first and second plungers associated with the respective first and second check valves, and each plunger having opposite first and second faces, of which said first faces of said first and second plungers are subjected to fluid in said first and second passages, respectively, and said second faces of said first and second plungers are subjected to fluid in said fourth and third passages, respectively, with said second face of said first plunger being of an area larger than that of said first face thereof at a given ratio, and each plunger opening the associated check valve when the total pressure of fluid on said second face thereof exceeds the total pressure of fluid on said first face thereof, said method comprising, for the high stage of the chuck operation, applying to said first cylinder end fluid of a first pressure via said first and third passages and first check valve while simultaneously venting said second passage, then relaxing the work grip of the chuck by applying to said first and second passages fluid of a second and third pressure, respectively, with said second and third pressures being lower than said first pressure and being of a ratio smaller than said area ratio so that said first check valve is opened for blending the fluid in said first and third passages and first cylinder end, and for the low stage of the chuck operation, venting said second passage while applying to said first passage fluid of a fourth pressure which is lower than said first pressure but not lower than said second pressure, and opening the chuck by applying to said second passage fluid of said first pressure while simultaneously venting said first passage.

6. Method of actuating for high-low chuck operation chuck operating mechanism as in claim 5, in which the areas of said second faces of both plungers are larger than the areas of the respective first faces thereof at the same ratio, so that said first and second cylinder ends will act as the chuck-closing and chuck-opening cylinder ends, respectively, in actuating the mechanism, for the high stage of the chuck operation, by applying fluid of said first pressure to said second cylinder end via said second and fourth passages and second check valve while simultaneously venting said first passage, for relaxing the work grip of the chuck, by applying fluid of said second and third pressures to said second and first passages, respectively, for the low stage of the chuck operation, by venting said first passage while simultaneously applying fluid of said fourth pressure to said second passage, and for opening the chuck by applying fluid of said first pressure to said first passage while simultaneously venting said second passage.

7. In a method of relaxing the work grip of a chuck operated by a mechanism having a cylinder in which a piston defines first chuck closing and second chuck opening ends, first and second fluid passages leading to said first and second cylinder ends, respectively, a check valve and a plunger, of which the check valve is interposed in said first passage and divides the same into first and second sections of which said second section extends between the check valve and first cylinder end, with the check valve being normally closed to block fluid flow from said first cylnder end and second passage section, and the plunger having opposite first and second faces subjected to fluid in said first passage section and in said second passage, respectively, with said second face being of an area larger than that of said first face at a given ratio and the plunger opening the check valve when the total pressure of fluid on said second face exceeds the total pressure of fluid on said first face, the method steps which comprise, providing communication between said first cylinder end and fluid of a first pressure via said first and second passage sections and check valve for maintaining the work grip of the chuck, and intercepting said communication and providing communication between said first passage section and fluid of a second pressure and between said second passage and fluid of a third pressure, with said second and third pressures being lower than said first pressure and being of a ratio smaller than said area ratio, so that the check valve will be opened to blend said first and second pressures for work grip relaxation.

* * * * *